Oct. 8, 1957     R. L. VAN ALLEN     2,808,990
POLARITY RESPONSIVE VOLTAGE COMPUTING MEANS
Filed Oct. 31, 1956     2 Sheets-Sheet 1
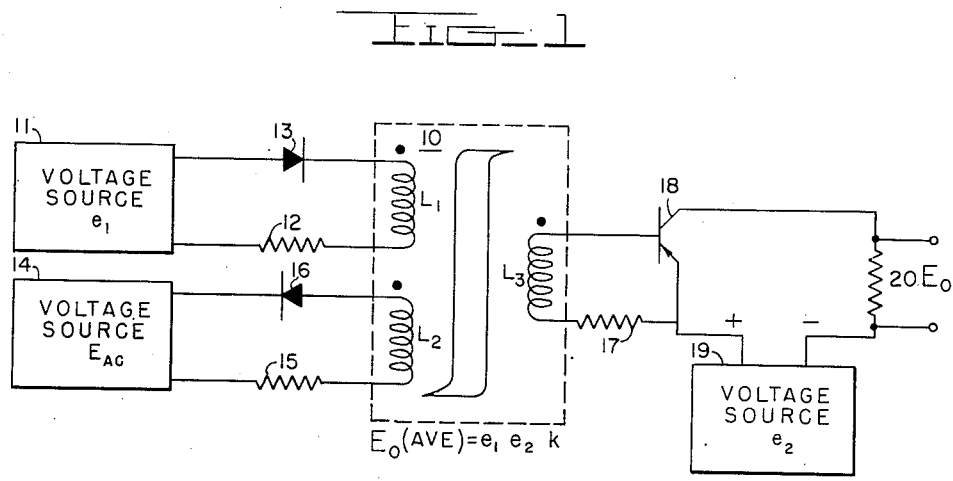
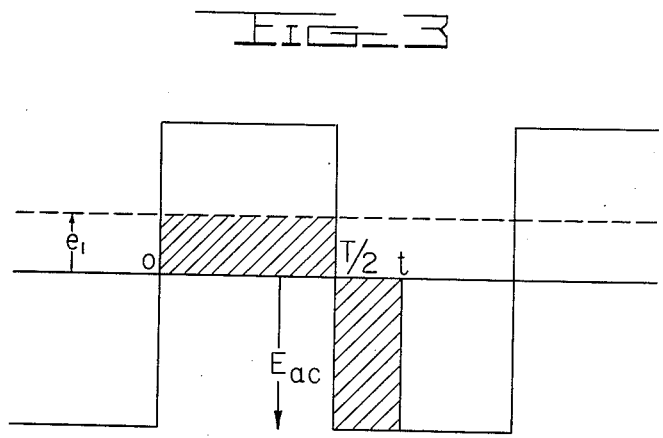
INVENTOR
ROLAND L. VAN ALLEN
BY *W.R. Maltby*
*Richard C. Reed*
                 ATTORNEYS Oct. 8, 1957 R. L. VAN ALLEN 2,808,990
POLARITY RESPONSIVE VOLTAGE COMPUTING MEANS
Filed Oct. 31, 1956 2 Sheets-Sheet 2
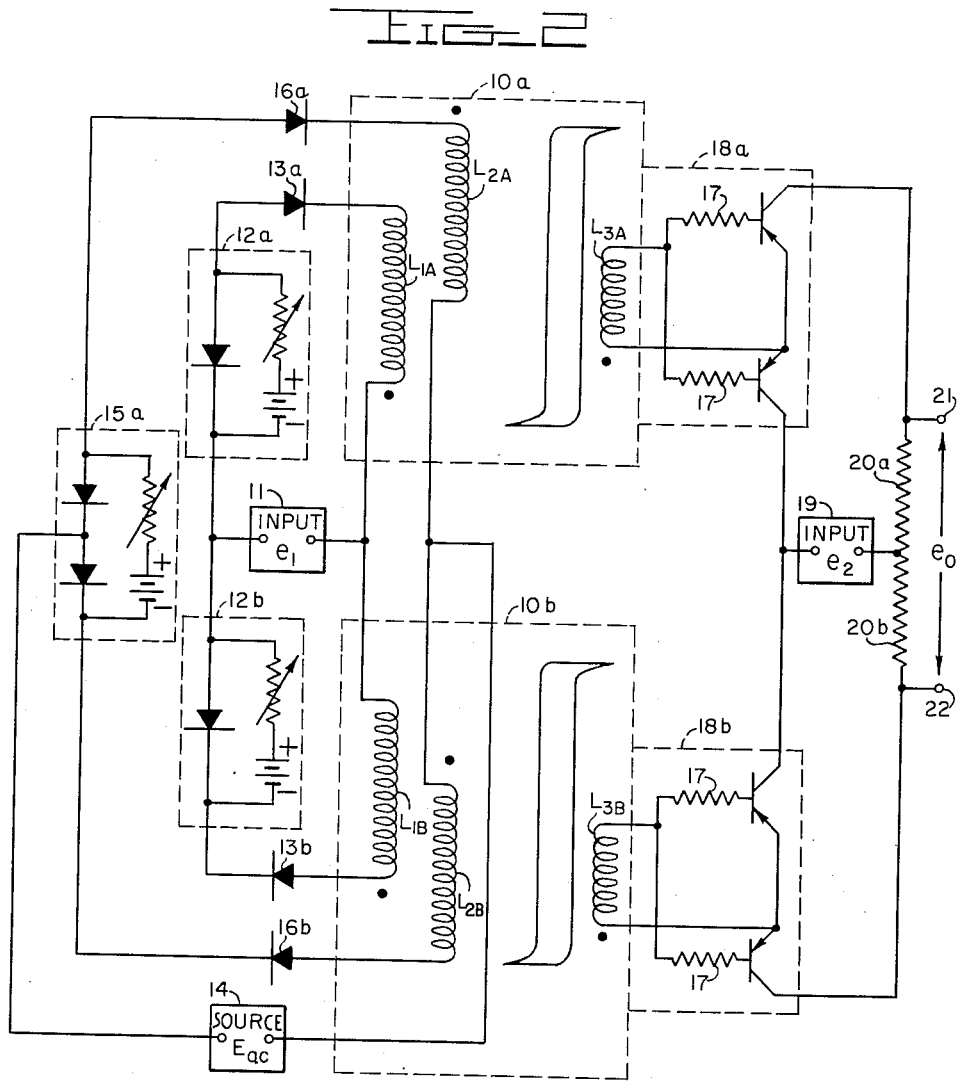
INVENTOR
ROLAND L. VAN ALLEN
BY
ATTORNEYS United States Patent Office 2,808,990
Patented Oct. 8, 1957

2,808,990

POLARITY RESPONSIVE VOLTAGE COMPUTING MEANS

Roland L. Van Allen, Alexandria, Va., assignor to United States of America as represented by the Secretary of the Navy Application October 31, 1956, Serial No. 619,651

4 Claims. (Cl. 235—61)

(Granted under Title 35, U. S. Code (1952), sec. 266)

The invention described herein may be manufactured and used by or for the Government of the United States of America for governmental purposes without the payment of any royalties thereon or therefor.

This invention relates in general to magnetic computing circuits and in particular to a polarity sensitive high speed computing means for producing an output voltage which is an analogue function of two input voltages.

The copending application of Roland L. Van Allen Serial No. 602,676 filed August 7, 1956, discloses a compact single quadrant voltage computing means for obtaining an analogue function of two input voltages. The invention described and claimed herein represents an improvement upon the single quadrant device disclosed in this copending application.

It will be appreciated that it is sometimes desirable in computer applications that the computing means be capable of providing an output voltage which is analogue function of two input voltages and is characterized by a polarity appropriate to the combination of the input voltage polarities.

It is the prime object of this invention to provide a polarity sensitive computing means for producing a variety of transcendental functions of two input voltages.

Other objects of this invention will become apparent upon a more comprehensive understanding of the invention for which reference is had to the attached specification and drawings.

In the drawings:

Fig. 1 is a schematic showing of the single quadrant multiplier described and claimed in the abovementioned copending application.

Fig. 2 is a schematic showing of an embodiment of the polarity sensitive computing means of the present invention.

Fig. 3 is a graphical showing of several voltage waveforms as employed in the embodiment of Fig. 2.

A rectangle is drawn between the transformer windings in Figs. 1 and 2 to indicate a core material having a substantially rectangular hysteresis characteristic.

Briefly, this invention employs two multiwinding transformers, each including a core of a material having a substantially rectangular hysteresis characteristic, and a transistorized switching means to obtain a polarity sensitive output voltage which is proportional to a transcendental function of two input voltages. A basic principle of operation of the device is to store voltage information in the magnetic core of one or the other of the transformers on one half cycle and then to read out of the core the same information as a time function on the next half cycle. The polarity of the voltage information to be stored determines which transformer is to be used for storage. A pulsed output voltage is obtained wherein the width of each pulse is proportional to one input voltage, the height of each pulse is proportional to the other input voltage and the polarity of each pulse is appropriate to the combination of the two input voltages. A principal utility of the device is to provide a product function of two input voltages. However, the device has considerable utility in a variety of other analogue computations, as well.

Referring now to the drawings:

Fig. 1 depicts a single quadrant computing means in simplified form which is demonstrative of the basic principle of operation of the four quadrant computing means of the present invention. In the circuitry of Fig. 1, a magnetic core material having a substantially rectangular hysteresis characteristic is utilized for the transformer 10. Transformer 10 comprises three windings $L_1$, $L_2$ and $L_3$ having the dot indicated winding sense or polarity relationship.

In the circuitry of Fig. 1, a voltage source 11 is connected via the current limiting impedance 12 across the winding $L_1$ of transformer 10. This circuitry provides for a change in flux level of the transformer core material from its original saturation level. It will be seen that the change in flux level is directly proportional to the magnitude of the output $e_1$ of voltage source 11. The direction of this change in flux level of the core material is dependent, of course, upon the direction of current flow in the winding $L_1$. To insure a change in flux level in only one direction with either an A. C. or a pulsating D. C. voltage source 11, a unidirectional element 13 may be inserted in serial connection as shown in the drawing.

As a means for returning the core material to its original flux level, a reset voltage source 14 is connected, in a manner similar to that described above, via the current limiting impedance 15 across the winding $L_2$ of transformer 10. Again, the change in flux level is proportional to the magnitude of the output of the voltage source. Likewise, the unidirectional element 16 shown in the drawing serves the same purpose as the unidirectional element 13. For reasons which will become apparent hereinafter, it is important to this simplified circuitry that the reset voltage source 14 provide an output of constant amplitude, periodically recurring pulses, for example, a rectified square wave, and that the output voltage be of sufficient magnitude to overcome the change in flux level produced by the highest anticipated output of voltage source 11. Preferably, the output of voltage source 14 should be of sufficient magnitude to bring the core material from one saturation level to the other.

The winding $L_3$ of transformer 10 is connected, via current limiting impedance 17, to a voltage sensitive switching means 18 which is operative to connect the output voltage $e_o$ of voltage source 19 across the load impedance 20. The switching means 18 is responsive to the magnitude and polarity of the voltage across the winding $L_3$ and is so connected to complete the circuit which applies voltage source 19 across the load impedance 20 during the time interval required to return the core material to its original saturation level. Thus the switching means is closed during the reset saturating period but once saturation takes place, the voltage across the winding drops to a minimum and opens the switch.

In the simplified circuitry of Fig. 1, a single PNP type transistor is shown connected as the switching means 18. While other types of voltage sensitive switching means might be employed where, for example, size is not a factor, it has been found that transistor switching means are particularly adaptable to this computing device and afford considerable advantage thereto.

In basic explanation of the operation of a PNP type transistor as a switching element, the collector to emitter impedance of such transistors is very high when both the collector and emitter voltages are equal to or more negative than the base voltage. As soon as the base becomes slightly negative with respect to both collector and emitter, however, the emitter-collector impedance drops to the vicinity of one ohm.

In Fig. 1, the emitter and base of the transistor switching means 18 are connected across the winding L₃. Thus when the voltage source 11 is instrumental in changing the flux level of the core material the transistor will not be in the conducting state since this applied a positive bias to the base. In the other case, when the voltage source 14 is returning the core material to its original saturation level, a negative voltage is applied to the base circuit, the transistor conducts and the output $e_2$ of voltage source 19 appears across the load impedance 20. In operational analysis of the circuitry of Fig. 1, which is applicable to the circuitry of Fig. 2, to be described, as well, the change in flux of a core material having a substantially rectangular hysteresis loop characteristic may be expressed by $$\phi = K \int_0^{t/2} e_1 dt \text{ volt seconds}$$

where K is a constant for the particular core, and $\phi$ is the total change in flux produced by a voltage $e_1$ applied to a winding on the core for a period of time $t/2$. If the core is always saturated at one knee of the hysteresis loop when the voltage $e_1$ is applied and the polarity of $e_1$ is chosen to produce a flux change toward the opposite knee, then the change in flux produced by $e_1$ will be proportional to the average value of $e_1$ for the time period $t/2$. The core will thus integrate the voltage $e_1$ and this volt second integral will be read in and stored as a flux level within the hysteresis loop.

By applying a constant magnitude voltage to return the core material to its original saturation level this volt second information may be read out on a time basis. The time required for read out, that is, to return to the original saturation level, is then proportional to the magnitude of the voltage $e_1$ read in, since the volt seconds read out equals the volt seconds read in. In other words, the same value of the integral is obtained in the first case for a variable voltage and constant time and in the second case for a constant voltage and variable time.

Fig. 2 depicts a preferred embodiment of the present invention which is fundamentally similar to the device of Fig. 1 but which differs in its circuitry and thus affords an input voltage polarity responsive output.

In the embodiment of Fig. 2, two transformers 10A and 10B are employed. Like in the transformer 10 of Fig. 1, a magnetic core material having a substantially rectangular hysteresis loop characteristic is utilized for each of the transformers 10A and 10B. In the transformers 10A and 10B, windings L₁ₐ and L₁ᵦ, respectively, are connected across the voltage source 11 and windings L₂ₐ and L₂ᵦ, respectively, are connected across the reset voltage source 14 such that the two transformers are individually responsive in the same manner as the transformer 10 to an input voltage $e_1$ and reset voltage $E_{AC}$. In this preferred embodiment, the two transformers, 10A and 10B, are connected in parallel across the input voltage source 11 and the reset voltage source 14 via oppositely polarized unidirectional elements, such that each of the transformers is responsive to an input voltage $e_1$ of opposite polarity to the other. In other words, an input voltage $e_1$ of positive polarity will produce a change in flux level in the core of transformer 10A but will not affect the flux level of the core in transformer 10B. Likewise, an input voltage $e_1$ of negative polarity will act to change the flux level of the core of transformer 10B without affecting the other transformer 10A. Of course, the change in flux level in either core is directly proportional to the magnitude of the input voltage $e_1$.

In this embodiment of the invention, unidirectional elements 13a and 13b are provided to control the direction of current flow in the winding L₁ₐ of transformer 10A and in the winding L₁ᵦ of transformer 10B, respectively. In a similar manner unidirectional elements 16a and 16b are provided to control the direction of current flow in the winding L₂ₐ of transformer 10A and in the winding L₂ᵦ of transformer 10B, respectively.

It will be seen that in the embodiment of Fig. 2, separate variable current limiters 12a and 12b, generally identified as current biased diodes, are provided to allow independent control of the input impedance which each transformer presents to signal $e_1$. Specifically, this may be accomplished by varying the resistance therein. When the resistances in current limiters 12a and 12b are adjusted for slightly less than the maximum current required to produce saturation the effect is as though resistance has been added in the circuit on the read in half cycle. When an unbalance exists between the winding L₁ₐ and L₁ᵦ, due to the particular core or transistors used in the circuitry, for example, it is possible to adjust the multiplying constant, K, for two quadrants independently of the other two. For example, when the resistance in 12a is adjusted, the value of K is changed in quadrants II and III, or when the resistance in 12b is adjusted, the value of K is altered in quadrants I and IV.

Another current limiting device 15a is provided in the circuitry which connects the voltage source 14 across the windings L₂ₐ and L₂ᵦ. This current biased diode, which affords current limiting in the back direction of the diodes, is common to both transformers and is connected to prevent loading of the voltage source 14 when the transformers have little or no voltage $e_1$ applied. Since on the read out half cycle, the voltage source 14 must supply sufficient current to permit saturation plus leakage current back through the voltage source 11 and base current for the transistors in the output circuitry, the current limiter 15a must be set to pass several times the current required to permit saturation of the transformer without load. The variable resistance in the current limiter 12a affords a limited control of the multiplying constant "K."

In the output circuitry of Fig. 2, the bidirectional switching means, 18a and 18b, connect the voltage source 19 across opposite halves of the load impedance, 20a and 20b, respectively, via the output windings L₃ₐ and L₃ᵦ, respectively. Each of the bidirectional switching means comprises two PNP type junction transistors with their emitter and base connected in parallel across their respective output windings. The collectors of the two transistors in each switching means are connected, one to the voltage source 19 and the other to the output load impedance 20a, 20b. By this arrangement, when the voltage source 11 is instrumental in changing the flux level of the core in transformer 10A, a voltage drop appears across the winding L₃ₐ, a positive bias is applied to the base of the transistors in switching means 18a, and neither transistor will conduct. When the voltage source 14 then returns the core material of transformer 10A to its original saturation level, a negative bias is applied to the base of the transistors in switching means 18a, the switching means conducts, and the output $e_2$ of voltage source 19 appears across the 20a portion of the load impedance.

The polarity of the voltage appearing across the output terminals 21, 22, of course, is dependent upon the direction of current flow through the 20a portion of the load impedance. It will be seen therefore that a reversal in polarity of the voltage source 19 output will produce a change in polarity across the output terminals 21 and 22.

In like manner, when the polarity of the output $e_1$ of voltage source 11 is reversed, the flux level of the core in transformer 10B is changed and a voltage drop appears across the winding L₃ᵦ. This applies a positive bias to the base of the transistors in switching means 18b and neither transistor will conduct. When the voltage source 14 then returns the core material of transformer 10B to its original saturation level, a negative bias is applied to the base of the transistors in switching means 18b, the switching means conducts, and the output $e_2$ of voltage source 19 appears across the 20b portion of the load impedance.

In this second case, the polarity of the voltage appearing across the output terminals 21, 22 of the load is dependent upon the direction of current flow through the 20b portion of the load impedance. Again, it will be seen that a reversal in polarity of the voltage source 19 output will produce a change in polarity across the output terminals 21, 22.

Consequently, input voltages $e_1$ and $e_2$ of similar polarity will produce a positive voltage across the output terminals 21, 22, and input voltages $e_1$ and $e_2$ of dissimilar polarities will produce a negative voltage across the output terminals 21 and 22.

Fig. 3 graphically depicts the D. C. output of voltage source 11 and the A. C. output $E_{AC}$ of voltage source 14 with the time interval during which each voltage source is effective to alter the flux level of the core material indicated by the cross-hatched area. It will be noted that each voltage source is effective only during its respective read-in or read-out half cycle.

Since in the circuitry of Fig. 1 and the embodiment of Fig. 2 it is the output $E_{AC}$ of voltage source 14 which establishes the read-in interval, between time zero and time $T/2$, and the read-out interval, between time $T/2$ and time $t$, it will be appreciated that a square wave output such as shown in Fig. 3 is to be preferred. It is, of course, within the purview of this invention to employ several constant D. C. supplies as the voltage source 14 and to employ an auxiliary time regulated switching means for establishing the read-in and read-out time intervals, if desired.

As previously discussed the output $e_2$ of voltage source 19 is continuously applied only during the read-out interval $T/2$ to $t$. Therefore it will be seen that a repetitive pulse output appears across the output terminals 21, 22, wherein the pulse width is proportional to $e_1$, the pulse height is proportional to $e_2$ and the repetition rate is determined by the frequency of the voltage source 14 output. Considering the simple case where the voltages $e_1$ and $e_2$ are of constant amplitude, it will be seen that the average output voltage across the output terminals is proportional to the product of $e_1$ and $e_2$.

While for purposes of simplicity, in the above operational analysis of the embodiments of this invention disclosed herein each of the voltage source outputs $e_1$, $e_2$ and $E_{AC}$ have been considered to have a constant amplitude it should be understood that it is not essential to this invention that this be the case. It can be shown by a more complex mathematical analysis that if $e_1 = e_1 f_1(t)$, $E = E f_E(t)$ and $e_2 = e_2 f_2(t)$ the product $e_1 e_2(t)$ is the same function of time as $f_E(t)$. The only restrictions on the variable $e_1$ are that its volt-time average over the period of a half cycle does not saturate the core.

As pointed out earlier, in order to realize the maximum range of values for the variable $e_1$ and to have half cycle response to read-out, the magnitude of the voltage $E_{AC}$ should be large enough to saturate the core in one half cycle at the operating frequency of the system which might be, for example, 2 kc. Further, it has been found that as the operating frequency of the system is increased above 2 kc, the accuracy of the system deteriorates due in part to a change in the hysteresis characteristic of the core material and in part to the inherent switching limitations of transistors at higher frequencies.

It will be seen that the embodiment of this invention exemplarily described in detail above may be ruggedly constructed in an extremely light and compact manner. It will be seen that the power handling capacity of the invention is only limited by the power handling capacity of the switching means. In addition, it has been found that these embodiments are relatively unaffected by temperature conditions. An average accuracy of $\pm 1.0\%$ has been obtained with these embodiments. It is seen that by a more discriminative selection of the core material and transistor components of the circuit greater accuracy may be readily attainable.

Finally, it is understood that this invention is to be limited only by the scope of the claims appended hereto.

What is claimed is:

1. An analogue computing device comprising first and second pluralities of mutually inductive windings, each of said first and second pluralities of windings being wound on a separate core of material having a substantially rectangular hysteresis characteristic with two predetermined saturation levels, a first input voltage source of reversible polarity, first and second unidirectional means; means for applying said first input voltage source via said first unidirectional means across a first winding in said first plurality when said first voltage source is of one polarity such as to permit a sufficient current flow therein to effect a significant change in flux level in the core thereof from a predetermined original saturation level; means for applying said first input voltage source via said second unidirectional means across a first winding in said second plurality when said first input voltage source is of the alternate polarity such as to permit a sufficient current flow therein to effect a significant change in flux level in the core thereof from a predetermined original saturation level; said change in flux level in each core being proportional to the magnitude of the voltage applied, a reset voltage source, means for applying said reset voltage source across a second winding in each of said pluralities in sequential time relation to the application of said first input voltage source across said first winding thereof, such as to effect a change in flux level in opposite direction to that produced by said first voltage source; the magnitude of the output of said reset voltage source and the period of application across said second windings being sufficient to return the respective cores to their original saturation levels; an output load impedance; said load impedance having first and second output terminals at the ends thereof and a midpoint terminal, a second input voltage source of reversible polarity electrically connected to said midpoint terminal; plus first and second switching means electrically connected to a third winding in said first and second pluralities, respectively; each of said first and second switching means being responsive to the polarity and magnitude of the voltage across its respective winding; each of said first and second switching means being operative independently of the other to connect said second input voltage source to said first and second output terminals, respectively, during the period required for the core of the respective third winding to be returned to its original saturation level by said reset voltage source.

2. An analogue computing device comprising first and second pluralities of mutually inductive windings, each of said first and second pluralities of windings being wound on a separate core of a material having a substantially rectangular hysteresis characteristic with two predetermined saturation levels, a first input voltage source of reversible polarity, first and second unidirectional means; means for applying said first input voltage source via said first unidirectional means across a first winding in said first plurality when said first voltage source is of one polarity such as to permit a sufficient current flow therein to effect a significant change in flux level in the core thereof from a predetermined original saturation level; means for applying said first input voltage source via said second unidirectional means across a first winding in said second plurality when said first input voltage source is of the alternate polarity such as to permit a sufficient current flow therein to effect a significant change in flux level in the core thereof from a predetermined original saturation level; said change in flux level in each core being proportional to the magnitude of voltage applied, a reset voltage source, means for applying said reset voltage source across a second winding in each of said pluralities in sequential time relation to the application of said first input voltage source across said first winding thereof, such as to effect a change in flux level in opposite direction to that produced by said first voltage source; the magnitude of the output of said reset voltage source and the period of application across said second windings being sufficient to return the respective cores to their original saturation level; means for limiting current flow in said first windings of said first and second pluralities when the respective second windings thereof are energized; means for limiting current flow in said second windings of said first and second pluralities when the respective first windings thereof are energized; an output load impedance; said load impedance having first and second output terminals at the ends thereof and a midpoint terminal, a second input voltage source of reversible polarity electrically connected to said midpoint terminal; plus first and second switching means electrically connected to a third winding in said first and second pluralities, respectively; each of said first and second switching means being responsive to the polarity and magnitude of the voltage across its respective winding; each of said first and second switching means being operative independently of the other to connect said second input voltage source to said first and second output terminals, respectively, during the period required for the core of the respective third winding to be returned to its original saturation level by said reset voltage source.

3. An analogue computing device comprising first and second pluralities of mutually inductive windings, each of said first and second pluralities of windings being wound on a separate core of a material having a substantially rectangular hysteresis characteristic with two predetermined saturation levels, a first input voltage source of reversible polarity, first and second unidirectional means; means for applying said first input voltage source via said first unidirectional means across a first winding in said first plurality when said first voltage source is of one polarity such as to permit sufficient current flow therein to effect a significant change in flux level in the core thereof from a predetermined original saturation level; means for applying said first input voltage source via said second unidirectional means across a first winding in said second plurality when said first input voltage source is of the alternate polarity such as to permit sufficient current flow therein to effect a significant change in flux level in the core thereof from a predetermined original saturation level; said change in flux level in each core being proportional to the magnitude of the voltage applied, a reset voltage source, means for applying said reset voltage source across a second winding in each of said pluralities in sequential time relation to the application of said first input voltage source across said first winding thereof, such as to effect a change in flux level in opposite direction to that produced by said first voltage source; the magnitude of the output of said reset voltage source and the period of application across said second windings being sufficient to return the respective cores to their original saturation levels; an output load impedance; said load impedance having first and second output terminals at the ends thereof and a midpoint terminal, a second input voltage source of reversible polarity electrically connected to said midpoint terminal; plus first and second bidirectional transistor switching means electrically connected to a third winding in said first and second pluralities, respectively; each of said first and second switching means being response to the polarity and magnitude of the voltage across its respective winding; each of said first and second switching means being operative independently of the other to connect said second input voltage source to said first and second output terminals, respectively, during the period required for the core of the respective third winding to be returned to its original saturation level by said reset voltage source.

4. An analogue computing device comprising first and second pluralities of mutually inductive windings, each of said first and second pluralities of windings being wound on a separate core of material having a substantially rectangular hysteresis characteristic with two predetermined saturation levels, a first input voltage source of reversible polarity, first and second unidirectional means; means for applying said first input voltage source via said first unidirectional means across a first winding in said first plurality when said first voltage source is of one polarity such as to permit sufficient current flow therein to effect a significant change in flux level in the core thereof from a predetermined original saturation level; means for applying said first input voltage source via said second unidirectional means across a first winding in said second plurality when said first input voltage source is of the alternate polarity such as to permit sufficient current flow therein to effect a significant change in flux level in the core thereof from a predetermined original saturation level; said change in flux level in each core being proportional to the magnitude of the voltage applied, a reset voltage source, means for applying said reset voltage source across a second winding in each of said pluralities in sequential time relation to the application of said first input voltage source across said first winding thereof, such as to effect a change in flux level in opposite direction to that produced by said first voltage source; the magnitude of the output of said reset voltage source; the magnitude of the output of said reset voltage source and the period of application across said second windings being sufficient to return the respective cores to their original saturation levels; means for limiting current flow in said first windings of said first and second pluralities when the respective second windings thereof are energized; means for limiting current flow in said second windings of said first and second pluralities when the respective first windings thereof are energized; an output load impedance; said load impedance having first and second output terminals at the ends thereof and a midpoint terminal, a second input voltage source of reversible polarity electrically connected to said midpoint terminal; plus first and second bidirectional transistor switching means electrically connected to a third winding in said first and second pluralities, respectively; each of said first and second switching means being responsive to the polarity and magnitude of the voltage across its respective winding; each of said first and second switching means being operative independently of the other to connect said second input voltage source to said first and second output terminals, respectively, during the period required for the core of the respective third winding to be returned to its original saturation level by said reset voltage source.

References Cited in the file of this patent

Electronics, October 1956, pages 160–163.